United States Patent
Green et al.

[11] Patent Number: 6,081,411
[45] Date of Patent: Jun. 27, 2000

[54] THIN FILM DISK MEDIA USING OPTIMUM SURFACE ORIENTATION TO WRITTEN DATA TRACKS

[75] Inventors: Paul M. Green, Morgan Hill; Wai C. Leung, San Jose, both of Calif.

[73] Assignee: International Business Machines Corporation, Armonk, N.Y.

[21] Appl. No.: 09/107,036

[22] Filed: Jun. 29, 1998

[51] Int. Cl.⁷ .................................................. G11B 5/82
[52] U.S. Cl. .............................................................. 360/135
[58] Field of Search .............................................. 360/135

[56] References Cited

U.S. PATENT DOCUMENTS

| | | | |
|---|---|---|---|
| 4,588,611 | 5/1986 | Shadzi | 427/129 |
| 5,099,615 | 3/1992 | Ruble et al. | 51/165.71 |
| 5,351,156 | 9/1994 | Gregory et al. | 360/74.1 |
| 5,364,655 | 11/1994 | Nakamura | 427/129 |
| 5,389,794 | 2/1995 | Allen et al. | 250/572 |
| 5,442,638 | 8/1995 | Awad et al. | 395/182.04 |
| 5,443,901 | 8/1995 | Mino et al. | 428/336 |
| 5,576,918 | 11/1996 | Bar-Gadda et al. | 360/135 |
| 5,599,590 | 2/1997 | Hayashi | 427/448 |
| 5,612,830 | 3/1997 | Gregory et al. | 360/69 |
| 5,623,386 | 4/1997 | Sullivan | 360/135 |
| 5,645,471 | 7/1997 | Strecker | 451/59 |
| 5,661,559 | 8/1997 | Brezoczky et al. | 356/353 |
| 5,853,847 | 12/1998 | Takahashi | 428/141 |

*Primary Examiner*—A. J. Heinz
*Attorney, Agent, or Firm*—Robert O. Guillot; Oppenheimer, Wolff & Donnelly LLP

[57] ABSTRACT

The hard disk drive manufacturing method of the present invention includes an initial determination of the orientation of the individual hard disks during the various processing steps and disk drive assembly steps. Specifically, the orientation of the hard disks in the assembled disk drive is ascertained, such that the direction of arcuate writing paths on the disk surface is known. Additionally, the orientation of non-random arcuate micro-scratches that appear on the disk surface during disk processing is ascertained. Where the arcuate path of the micro-scratches corresponds to the arcuate writing paths on a disk surface, the disk process is altered to effectively reorient the disk in its mounting in the hard disk drive. The result of the process alteration is that there is no longer a correspondence between the arcuate path of the micro-scratches and the arcuate written data paths, and a significant reduction in the number of defects on the surface of the hard disk is obtained.

15 Claims, 11 Drawing Sheets

THIN FILM DISK MEDIA USING OPTIMUM SURFACE ORIENTATION TO WRITTEN DATA TRACKS

BACKGROUND OF THE INVENTION

1. Field of the Invention

The present invention relates generally to methods for manufacturing hard disk drives, and particularly to methods for reducing the number of writing defects in magnetic thin film hard disks by optimizing the orientation of the disks prior to disk drive assembly.

2. Description of the Prior Art

The manufacturing of hard disk drives involves many processing steps which are beneficially automated to increase throughput and reduce the cost of the ultimate hard disk drive end product. During the manufacturing process, groups of disks are mounted in carriers for processing, and the orientation of the carriers, and therefore the disks within the carriers is a known process parameter throughout all processing steps, and that orientation is repeated for all processed disks. That is, the orientation of the disks is consistently controlled throughout the hard disk manufacturing process from the first loading of initial disk substrates through the cleaning processes, through the thin film deposition processes, and ultimately through the mounting of the disks upon the hard disk drive spindles.

During certain manufacturing processing steps, particularly the disk washing steps, non-random arcuate submicron sized surface scratches, or micro-scratches, are often formed on the disk surfaces. These micro-scratches have resulted in an unacceptably high percentage of defective disk drives where the micro-scratches produce too many defective magnetic data bits in the surfaces of the individual hard disks of the disk drive. While altering the disk processing devices to reduce the occurrence of such micro-scratches is possible, this is an expensive solution. There is therefore a need in the disk drive manufacturing industry for a method of reducing the number of hard disk defects without reducing the occurrence of micro-scratches on the disk surfaces.

SUMMARY OF THE INVENTION

The hard disk drive manufacturing method of the present invention includes an initial determination of the orientation of the individual hard disks during the various processing steps and disk drive assembly steps. Specifically, the orientation of the hard disks in the assembled disk drive is ascertained, such that the direction of arcuate writing paths on the disk surface is known. Additionally, the orientation of non-random arcuate micro-scratches that appear on the disk surface during disk processing is ascertained. Where the arcuate path of the micro-scratches corresponds to the arcuate writing paths on a disk surface, the disk process is altered to effectively reorient the disk in its mounting in the hard disk drive. The result of the process alteration is that there is no longer a correspondence between the arcuate path of the micro-scratches and the arcuate written data paths, and a significant reduction in the number of defects on the surface of the hard disk is obtained.

It is an advantage of the present invention that fewer hard disk drives are rejected following manufacturing thereof.

It is another advantage of the present invention that hard disk drives having relatively fewer defects are manufactured where the individual hard disks of the disk drive include generally the same number of micro-scratches that they previously had.

It is a further advantage of the present invention that a simple inexpensive modification in the disk substrate pre-wash step produces improved hard disk drive performance.

It is still another advantage of the present invention that individual hard disks that have an unacceptably high number of magnetic bit defects when mounted in a hard disk drive in a first orientation have a reduced number of defects when mounted in a hard disk drive in a second orientation.

It is still a further advantage of the present invention that a more efficient hard disk drive manufacturing process has been developed, which results in increased throughput and reduced costs in hard disk drive manufacturing.

These and other features and advantages of the present invention will be well understood upon consideration of the following drawings and detailed description of the invention.

IN THE DRAWINGS

DETAILED DESCRIPTION OF THE PREFERRED EMBODIMENTS

The process for manufacturing thin film hard disks for mounting in hard disk drives seeks to produce hard disks that contain a minimal number of defects. In this regard, a defect generally constitutes an area of the hard disk surface in which magnetic data bits cannot be successfully written and subsequently read. Such defects are generally caused by flaws in the surface of the disk substrate, such as pits, bumps and scratches. To reduce the occurrence of such defects, the surface of the disk substrate is polished, and cleaned and washed during manufacturing. Thereafter, the thin film layers that comprise the magnetic media are deposited, such as by sputtering, upon the surface of the substrate.

It has been found by the inventors that during certain disk substrate processing steps, that arc shaped scratches having submicron width and depth are formed in the surface of the substrate, and that these submicron scratches or micro-scratches are not random. Through testing it has been determined that the micro-scratches are formed on both sides of the two-sided disk, and that the arcuate path of the micro-scratches is the same on both sides of the disk. A likely source of the arcuate micro-scratches is a disk pre-washing process step in which a rotating disk washing device is utilized. These micro-scratches do not always create defects in the written magnetic data bits that intersect with the micro-scratch; however, where the orientation of the micro-scratch corresponds to a particular orientation of the magnetic data bit, the bit is likely to be rendered defective (unreadable).

Further testing has revealed that the path of these arcuate micro-scratches may closely correspond to the arcuate written data path created by the standard pivotally mounted actuator assembly and read/write head of a hard disk drive. Thus, where the arcuate paths of the micro-scratches and the written data paths closely correspond, a significant number of defective bits can occur which can result in the rejection of the hard disk drive altogether.

The inventors have further found that a significant reduction in the number of defects can be achieved by re-orienting the disk corresponding to flipping the disk over prior to mounting the disk in a hard disk drive and subsequently writing on the disk. The improvement occurs because when the disk is flipped over to its second orientation, the arcuate path of the micro-scratches no longer corresponds to the arcuate data writing path from the pivotally mounted read/write head. The following description, as augmented by the drawings, will provide a detailed understanding of the invention.

Figure 1:
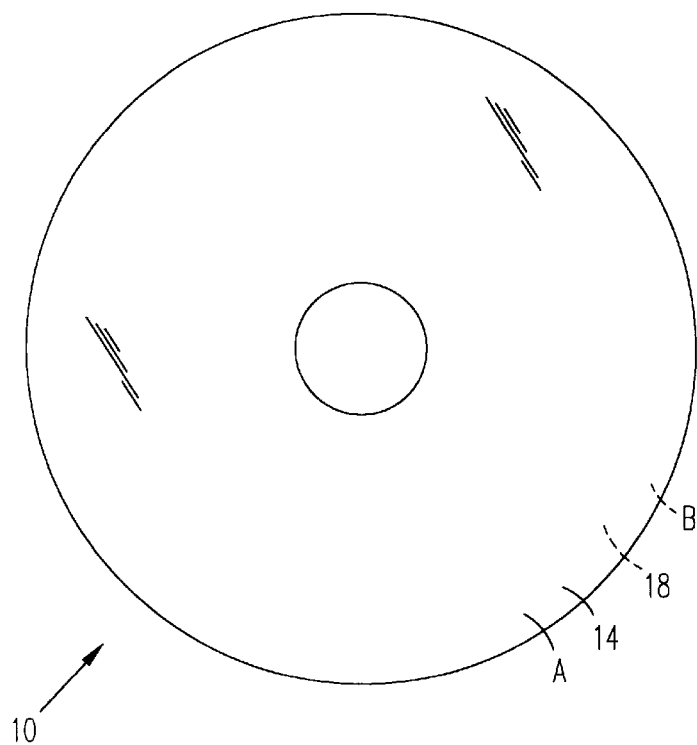
FIG. 1 is a top plan view of a typical data storage disk.
Figure 5:
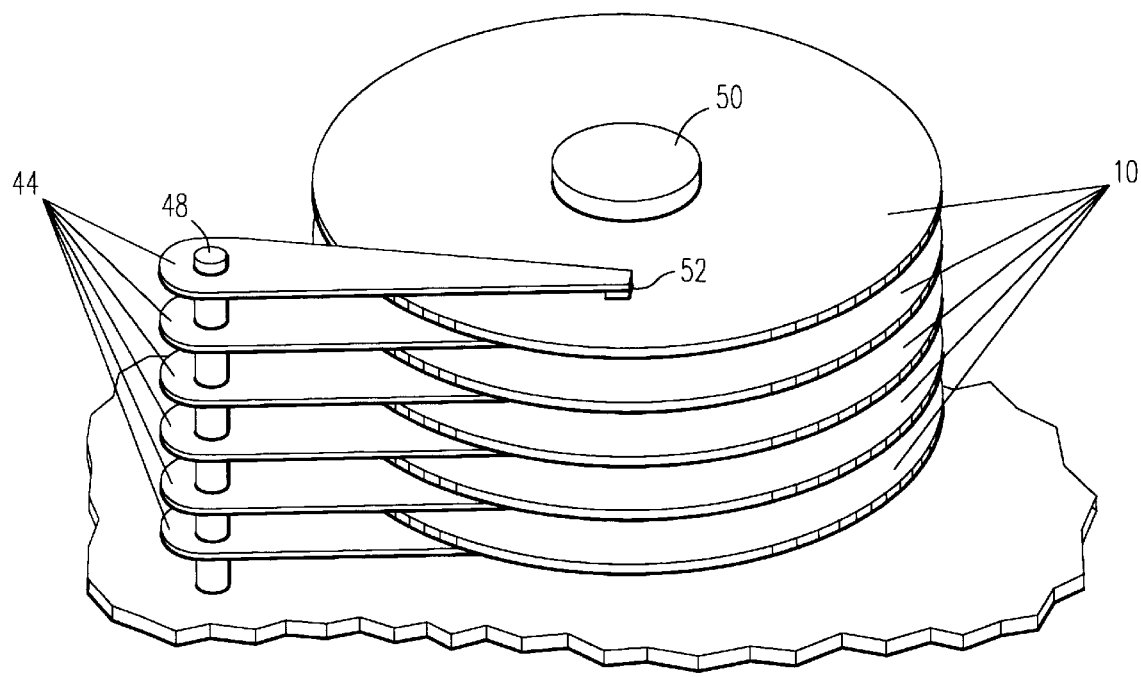
FIG. 5 depicts a hard disk drive including a stack of disks.

FIG. 1 depicts a standard thin film magnetic disk 10 as is well known in the industry having an upper surface 14, designated by the letter A, and a lower surface, designated by the letter B shown by phantom line 18. Such disks have magnetically responsive thin films formed on both surfaces 14 and 18, and a plurality of such disks are typically, coaxially mounted about a common rotatable spindle to form the data storage component of a hard disk drive, such as is generally depicted in FIG. 5. While invisible to the unaided eye of an observer, both surfaces 14 and 18 of the disk 10 of FIG. 1 invariably contain a plurality of minute micro-scratches and other uneven surface features that may cause defects when magnetic data bits are written onto the surfaces of the disk 10.

Figure 2:
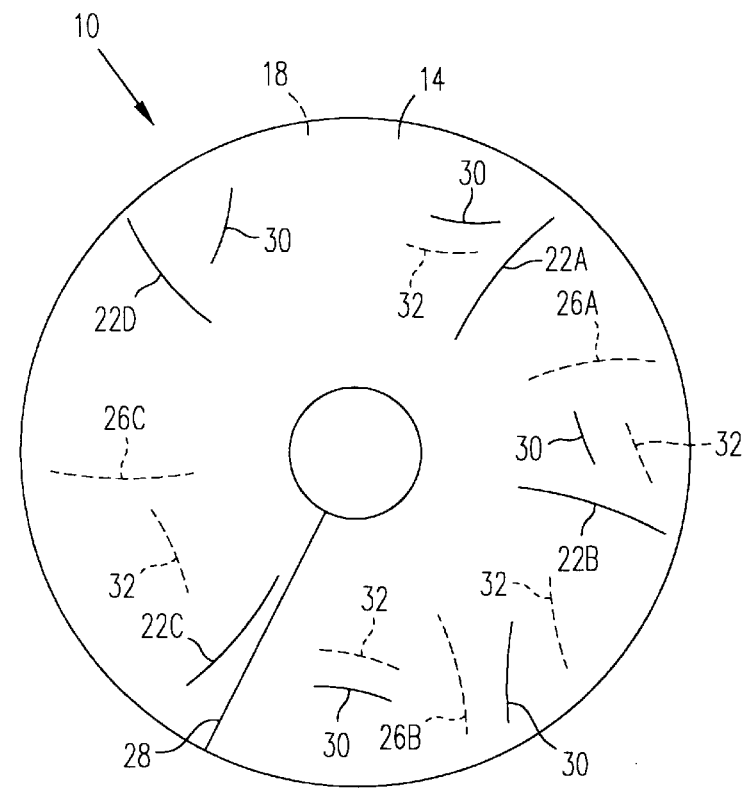
FIG. 2 depicts the disk of FIG. 1 in a "first" manufacturing orientation.

FIG. 2 depicts the disk 10 of FIG. 1 wherein surface micro-scratches have been enlarged for depiction and comprehension, it being understood that the depth and width of the micro-scratches have submicron dimensions. The disk 10 depicted in FIG. 2 corresponds to a first manufacturing orientation in which scratches in the upper surface 14 are shown by solid lines and scratches in the lower surface 18 are shown by dotted lines. Thus, the upper surface 14 includes linear arcuate micro-scratches 22 (A–D) and the lower surface 18 includes linear arcuate micro-scratches identified by the dotted lines 26 (A–C). It is significant to note that the upper surface scratches 22 and the lower surface scratches 26 all have the same arcuate curve relative to a radial line 28 drawn on the disk surface, and that the arcuate curve is in the same direction. Experimentation has determined that the upper surface scratches 22 and the lower surface scratches 26 are not randomly created whereas other surface micro-scratches 30 and 32 formed in the upper and lower surfaces respectively of the disk 10 are randomly created. The upper surface scratches 22 and lower surface scratches 26 are apparently formed as a direct result of certain disk pre-washing process steps as is described in detail hereinbelow. Therefore, all processed disks undergo a similar disk washing process step will to some degree include the non-random arcuate submicron scratches 22 and 26 in the surfaces thereof.

Figure 3:
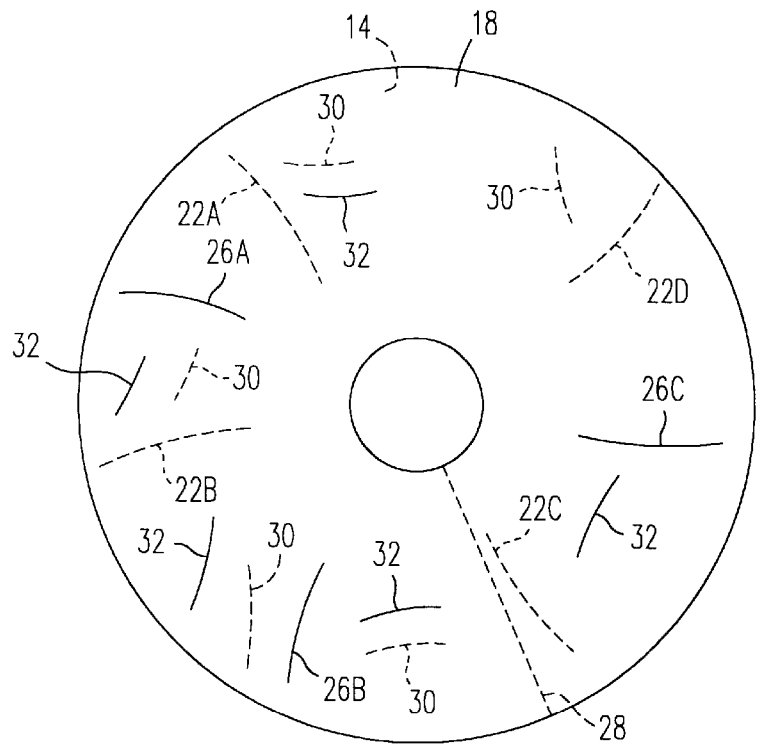
FIG. 3 depicts the disk of FIG. 2 in a "second" (flipped over) orientation.

For ease of comprehension of the invention, FIG. 3 depicts the disk 10 of FIG. 2 in a flipped over orientation, such that side 18 is the upper surface and side 14 is the lower surface. As can be seen by comparing FIGS. 2 and 3, surface scratches 26 of side 18 are now on top (depicted by solid lines) and the surface scratches 22 are now on the lower surface (depicted by dotted lines). It is significant to note that the arcuate path of all of the scratches 26 (A–C) and 22 (A–D) has been reversed when the disk 10 was flipped over. The significance of the reversal in the direction of the arcuate path of the scratches will become apparent herebelow.

Figure 4:
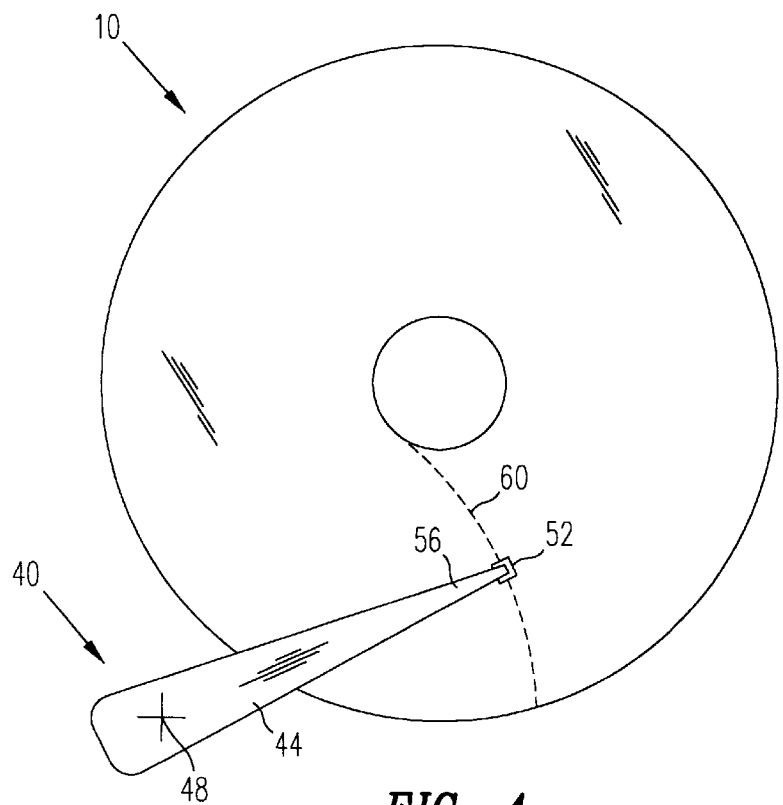
FIG. 4 depicts a standard pivotally mounted arm and read/write head with a typical disk.

FIG. 4 depicts the well known disposition of a hard disk 10 relative to an actuator assembly 40, including an arm 44 that is pivotally mounted 48 and a read/write head 52 disposed at its outboard end 56. Such a read/write head is disposed to form magnetic data bits upon the thin film layer of the disk 10. It is significant to note that the read/write head makes an arcuate path 60 across the surface of the disk 10 due to the pivotally mounted arm 44. As is well known and generally depicted in FIG. 5, a typical hard disk drive includes a plurality of disks 10 rotatably mounted upon a spindle 50, wherein each surface of each disk interacts with a pivotally mounted arm 44 and associated read/write head 52. Thus, in FIG. 5, a plurality of actuator arms 44 are mounted about a common pivot axis 48, wherein each arm 44 contains a read/write head 52. Although not depicted in FIG. 14, actuator arms 44 disposed between two disks 10 have two read/write heads disposed thereon to interact with the two disk surfaces that the arm 44 projects between.

Figure 6:
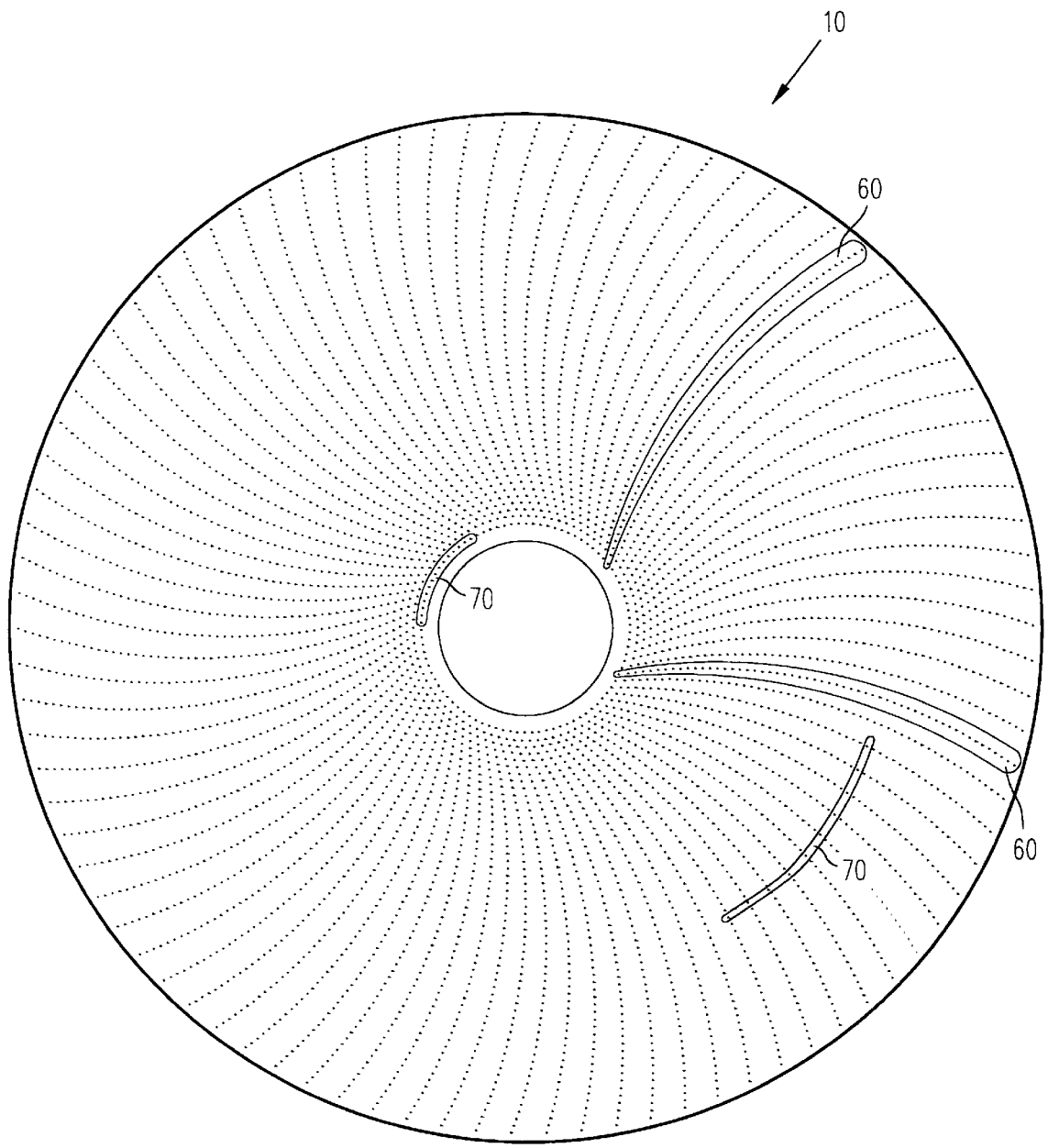
FIG. 6 depicts the orientation of data written on a disk by the pivotally mounted read/write head as shown in FIGS. 4 or 5.
Figure 7:
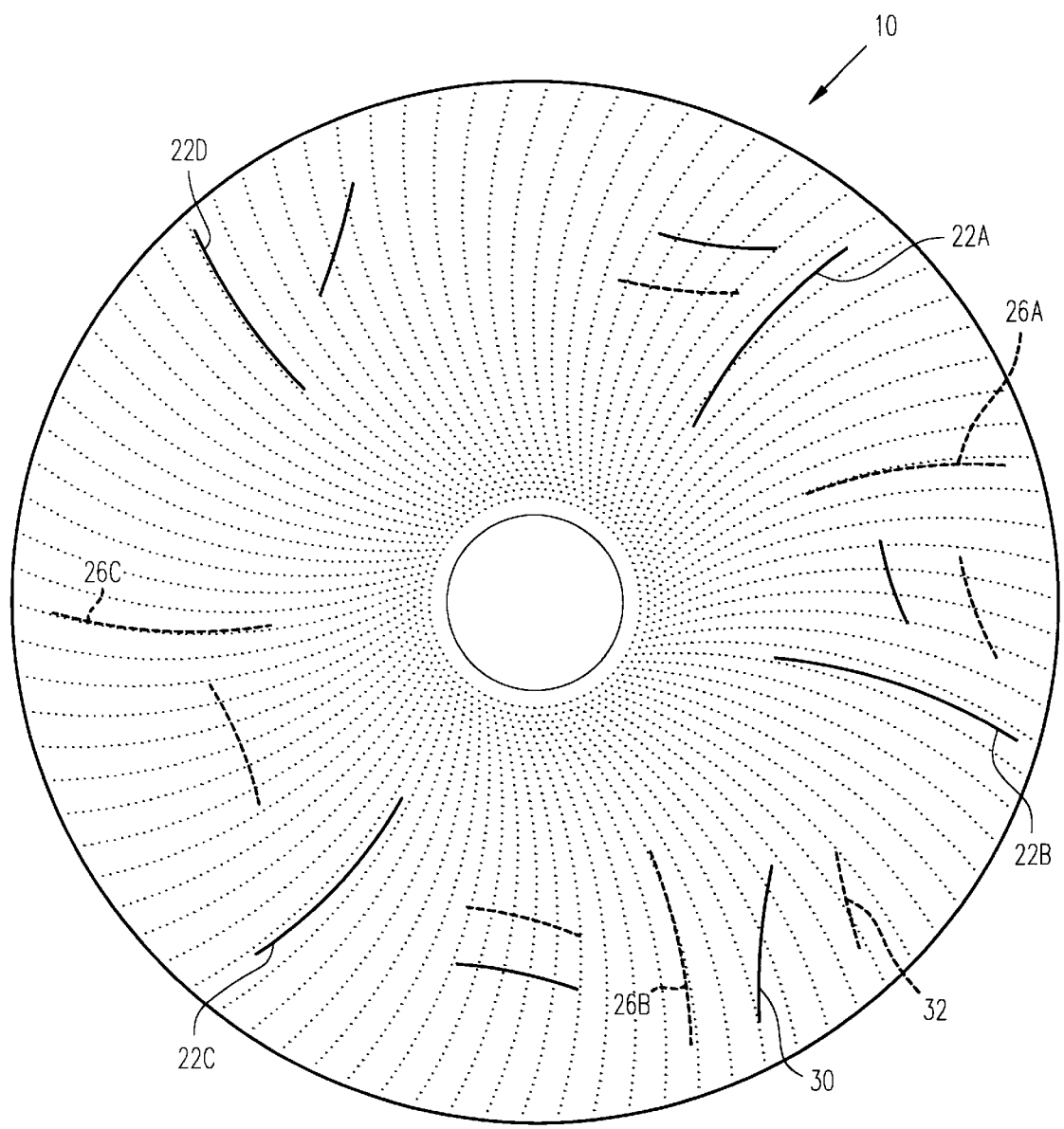
FIG. 7 depicts data written upon the first orientation disk of FIG. 2 by the pivotally mounted arm as shown in FIGS. 4 or 5.

FIG. 6 is a generalized depiction of magnetic data bits that have been written on the surface of a disk 10. As is well known, the data is organized into a large number of concentric circular tracks, depicted by arcuate sections 70, and that the individual data bits within each track are formed along the arcuate data bit writing path 60 that is traveled by the read/write head 52 due to its mounting on the pivotal arm 44. Identical arcuate data writing paths 60 are formed on both sides of the disk due to the pivotal mounting of the read/write heads for both sides of the disk (as shown in FIG. 7). It is to be understood that FIG. 6 is presented for descriptive purposes, and that actual disks 10 include many more tracks and many more data bits than are depicted in FIG. 6, and that the linear density of the data bits 80 along the tracks 70 in the circumferential direction is greater than the radial density of the data bits 80 along the arcuate writing paths 60.

FIG. 7 depicts the disk of FIG. 2 having data in the form depicted in FIG. 6 written thereon. The arcuate surface scratches 22 (A–D and 26 (A–C) of both sides of the disk of FIG. 2 are shown in relation to the written data bit orientation. The close correspondence of the arcuate shape of the scratches, such as scratches 22D and 26A, with the arcuate written data path on both sides of the disk 10 is apparent. It is also to be noted that the random scratches 30 and 32 do not correspond to the arcuate shape of the written data path. As will be better understood with the aid of FIGS. 8–12, the non-random scratches 22 and 26 produce significantly more disk defects than do the random scratches 30 and 32.

Figure 10:
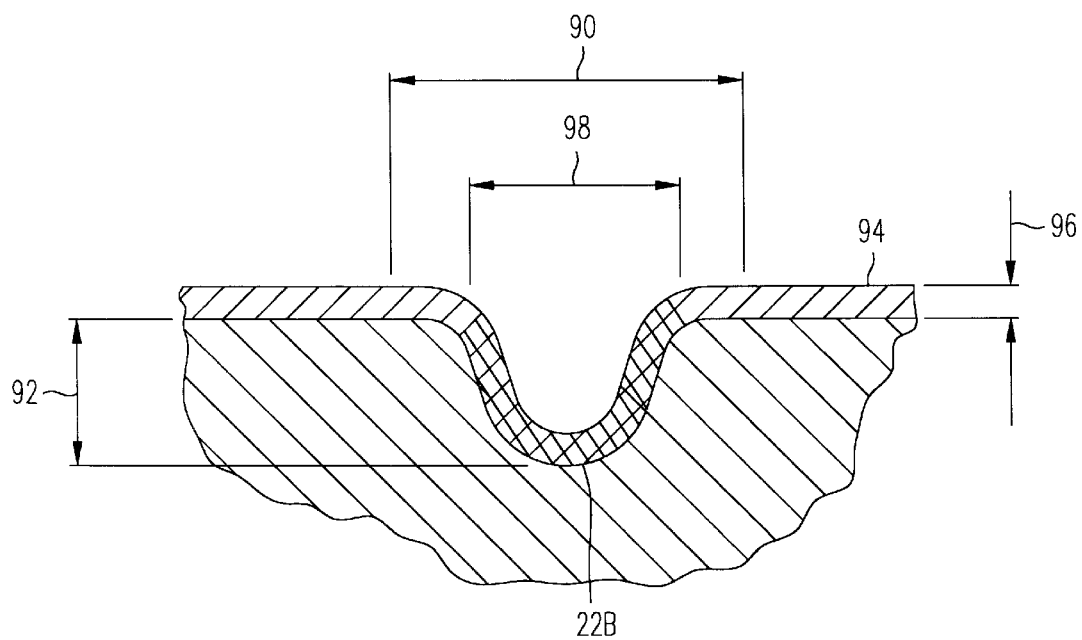
FIG. 10 depicts a cross-sectional view of the micro-scratch depicted in FIG. 9, taken along liens 10—10 of FIG. 9.
Figure 8:
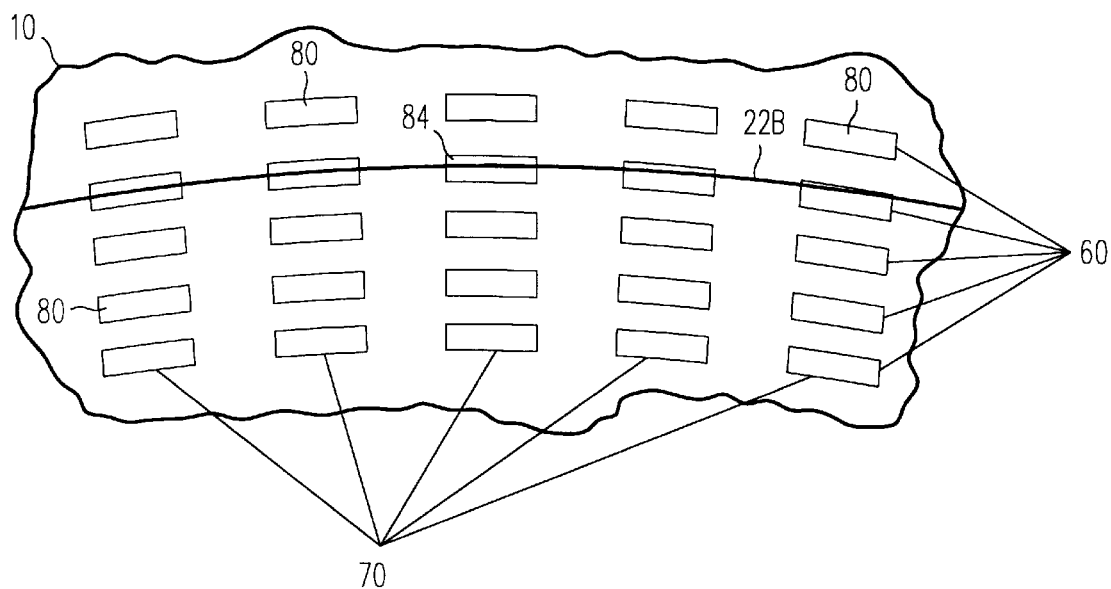
FIG. 8 is an enlarged view depicting a single linear micro-scratch of FIG. 7 having path that corresponds to the written data bit orientation from the pivotally mounted arm.
Figure 9:
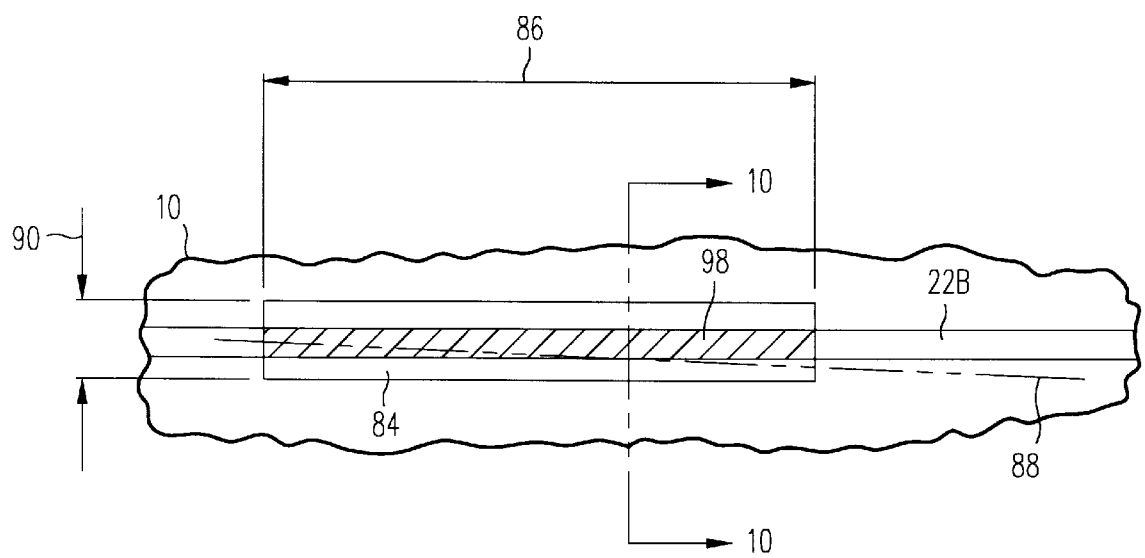
FIG. 9 depicts an enlarged single magnetic data bit of FIG. 8 with the scratch passing therethrough.
Figure 11:
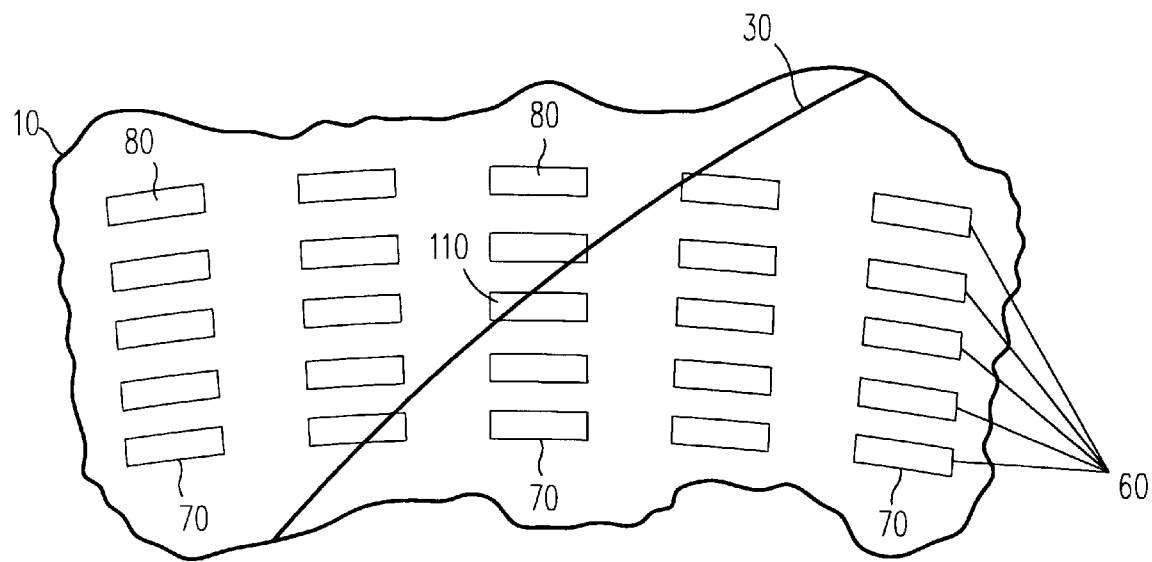
FIG. 11 depicts an enlarged view of a linear micro-scratch of FIG. 7 whose path does not correspond to the written data bit orientation from the pivotally mounted arm.
Figure 12:
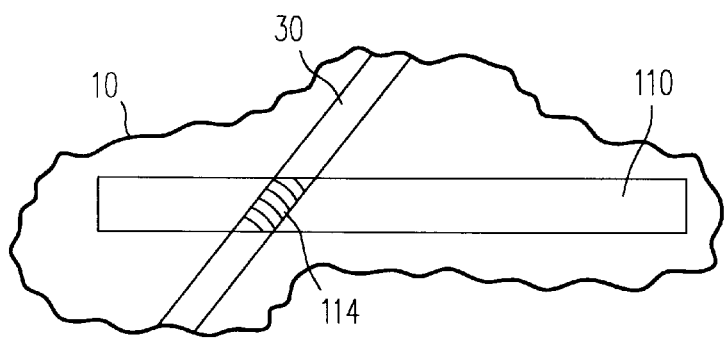
FIG. 12 depicts an enlarged single magnetic data bit of FIG. 9 with the scratch passing therethrough.

FIG. 8 depicts an enlarged view of the interaction of scratch 22B with written magnetic data bits on a portion of the surface of the disk depicted in FIG. 7 and FIG. 9 depicts an enlarged view of a magnetic data bit of FIG. 8, and FIG. 10 is a cross-sectional view of the magnetic data bit of FIG. 9 taken along lines 10—10 of FIG. 9. In like manner, FIG. 11 depicts an enlarged view of a random micro-scratch 30 upon a portion of the surface of the disk depicted in FIG. 7, and FIG. 12 depicts an enlarged view of a single magnetic data bit depicted in FIG. 11. As depicted in FIG. 8, individual magnetic data bits 80 are written upon the surface 14 of the disk 10 in arcuate paths 60 and in data tracks 70. The scratch 22B has an arcuate shape that closely corresponds with the data path 60, such that the scratch 22B passes through a plurality of magnetic bits, such as bit 84. As is best seen in FIG. 9, bit 84 comprises a generally rectangular area of the surface 14 that has been magnetized by the write head 52. The bit 84 has a length dimension 86 along its longitudinal axis 88 in the arcuate path 60 direction that is substantially greater than its width dimension 90 in the track 70 direction, and typically, the aspect ratio (length/width) of the data bits 80 is somewhat greater than 10. Significantly, the scratch 22B passes through the data bit 84 in a manner that is substantially parallel to the longitudinal axis 88 of the bit 84.

Referring to FIG. 10, the micro-scratch 22B is shown in cross-section to pass through the data bit 84 which has a width 90. The micro-scratch 22B may generally have a depth 92 of approximately 0.5 microns, whereas the thin film layers 94 (shown generally as one layer for ease of depiction) may have a cumulative thickness of approximately 0.05 microns. Thus, it is to be understood that the micro-scratch 22B constitutes a substantial disruption in the otherwise smooth surface characteristics of the data bit 84, such that the cross-hatched portion 78 (See FIG. 9) of the data bit 84 is not effectively magnetizable. Therefore, owing to the orientation of the scratch 22B relative to the shape of the data bit 84, a significant surface area portion of the data bit 84 is not effectively magnetizable. Where a significant portion, such as 60%, of the data bit surface is not effectively magnetizable, the data bit area cannot be successfully written upon, such that a repeatable write/read step cannot be accomplished at the data bit area. This constitutes a defect, or defective data bit location, on the surface 14 of the disk 10. Where a significant number of such defects exists, the entire hard disk is determined to be defective, and it is rejected.

Turning to FIGS. 11 and 12, a micro-scratch 30 is shown having a path that does not correspond to the arcuate writing path 60 of the data bits. While the scratch 30 passes through a number of data bits 80, it does not render any of the data bits defective, as can be understood with the aid of FIG. 12. As depicted in FIG. 12, the scratch 30 passes through the magnetized data bit 110 of FIG. 11. However, owing to the angle with which the scratch 30 passes through the data bit 110, only a small, cross-hatched area 114 of the surface area of the data bit 110 is not effectively magnetizable. Thus, more than approximately 90% of the surface area of the data bit 110 is magnetizable, and a write/read operation can be successfully conducted at data bit 110. Thus, data bit 110 does not constitute a defect, whereas data bit 84 of FIG. 9 does constitute a defect. It is therefore to be understood that the correspondence of the arcuate path of the micro-scratches on a disk, relative to the arcuate written data paths of the disk has a very significant impact on whether defects are found on the disk.

Figure 13:
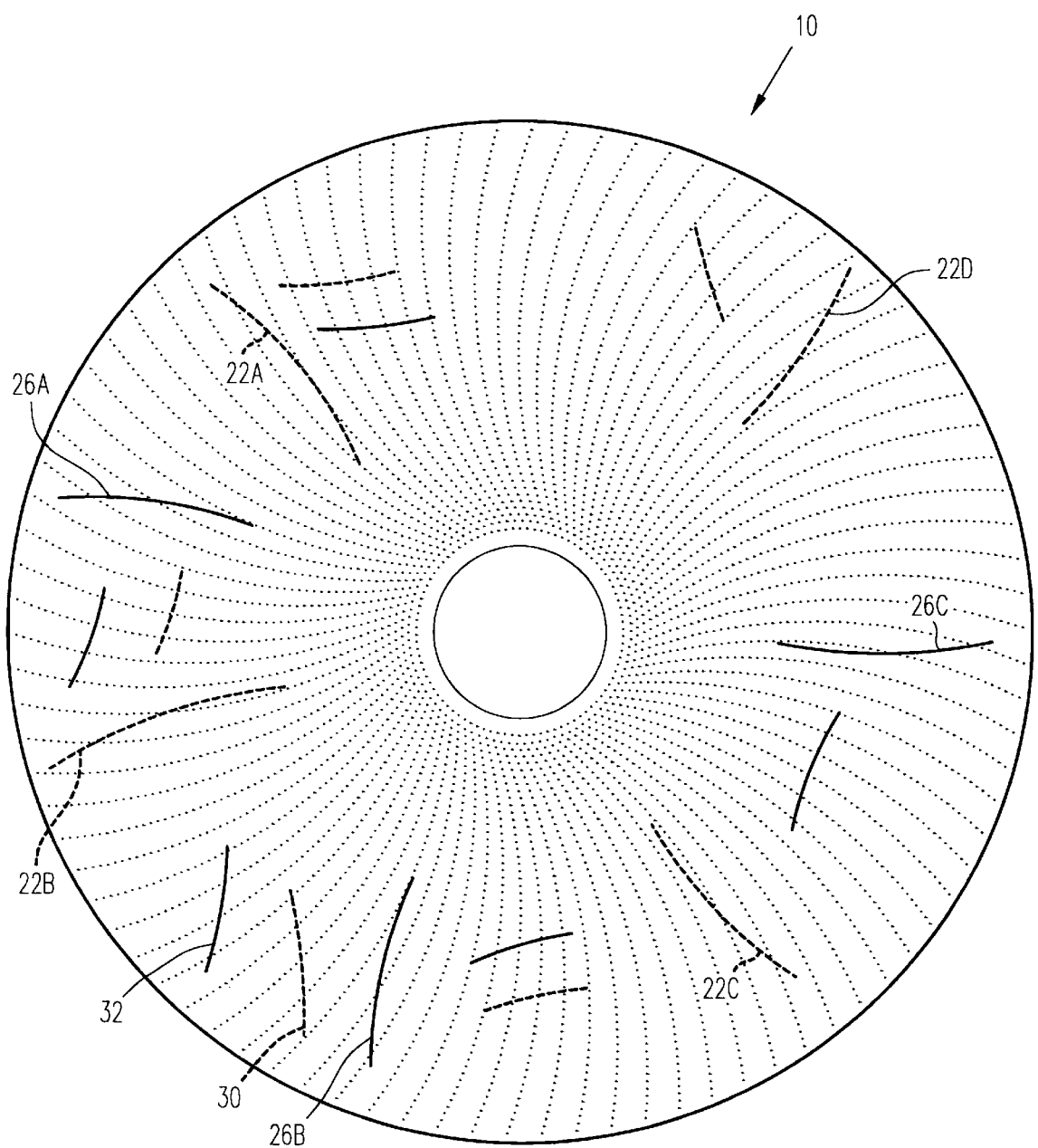
FIG. 13 depicts data written on a second orientation (flipped) disk of FIG. 3 by the pivotally mounted arm as shown in FIGS. 4 or 5.

FIG. 13 depicts the disk of FIG. 3 (the flipped over disk with side B up) having data written thereon. It is significant that the arcuate paths of the scratches 22(A–D) and 26(A–C) no longer correspond to the arcuate written data paths 60 throughout substantial portions of the scratch paths. The scratches 22 and 26 in the orientation shown in FIG. 13 correspond far more to the scratch orientation depicted in FIG. 12 than the scratch orientation depicted in FIG. 9. That is, far fewer scratches result in the destruction of a significant portion of a data bit area, so as to constitute a defective data bit. Thus, a disk that is placed in the second orientation (B side up) prior to writing thereon results in fewer defects and therefore fewer rejected hard disk drives.

Figure 14:
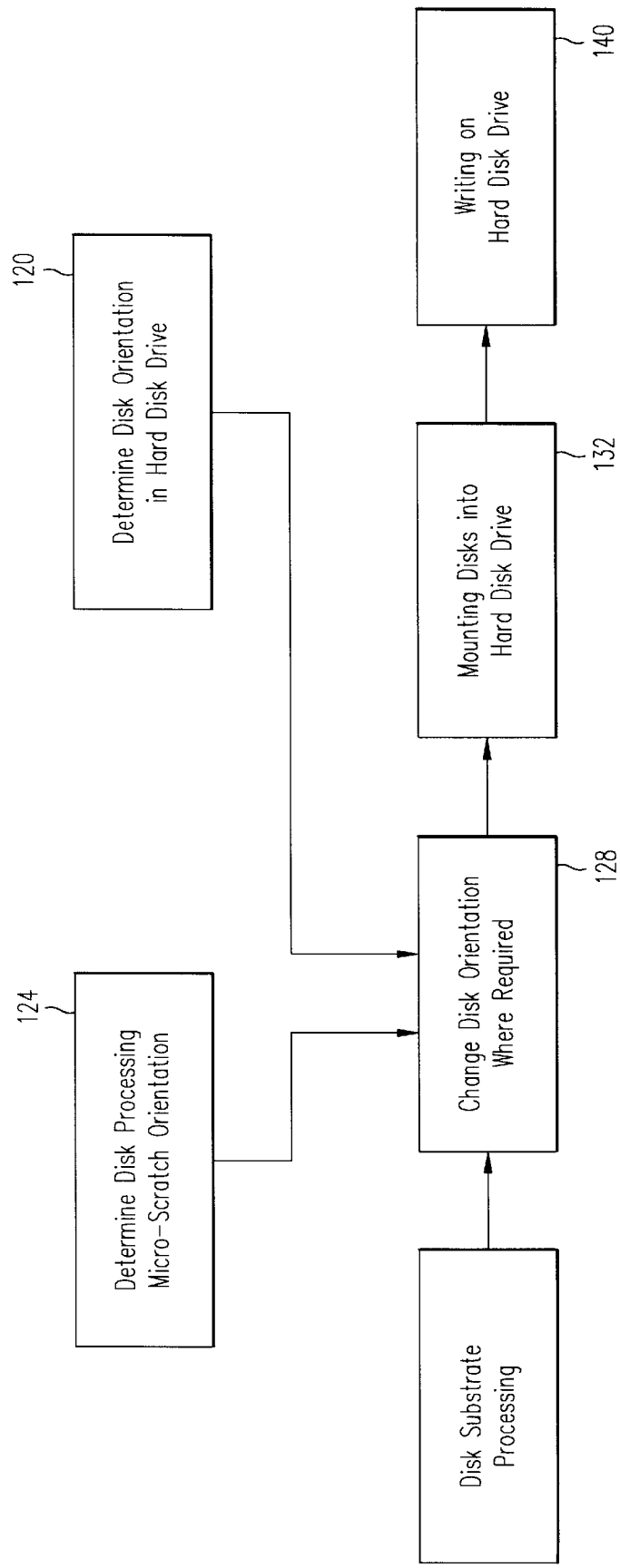
FIG. 14 is a schematic diagram of the disk manufacturing process of the present invention.

To further the comprehension of the invention, the disk manufacturing process of the present invention is depicted in a process schematic FIG. 14. As is generally known to those skilled in the art, disks are processed in discrete groups that are generally held within disk carrying devices during various process steps. As such, the orientation of all disks is known and controlled throughout the disk manufacturing processes and also thereafter when individual disks are assembled into a multi-disk hard disk drive, such as is depicted in FIG. 5. Therefore, the manufacturing process of the present invention, as generally depicted in FIG. 14, may be implemented by determining 120 the disk orientation (A side up or B side up) as the disks will be assembled in the hard disk drive. Also it is determined 124 what the orientation will be of possible micro-scratches formed during the substrate manufacturing processing steps, as has been described hereinabove. Based thereon, a change 128 in the disk orientation can be made prior to the mounting 132 of the disks in the hard disk drive, such that the optimum micro-scratch orientation relative to the arcuate read/write head path 60 can be achieved. Thus, the generalized processing steps include the disk substrate processing 136, which includes a change 128 in the disk orientation where necessary, followed by mounting 132 the disks into the hard disk drive assembly, and the writing on the hard disk drive 140. A preferred embodiment of a disk substrate pre-wash processing step of FIG. 14 is next described with the aid of FIGS. 15 and 16.

Figure 15:
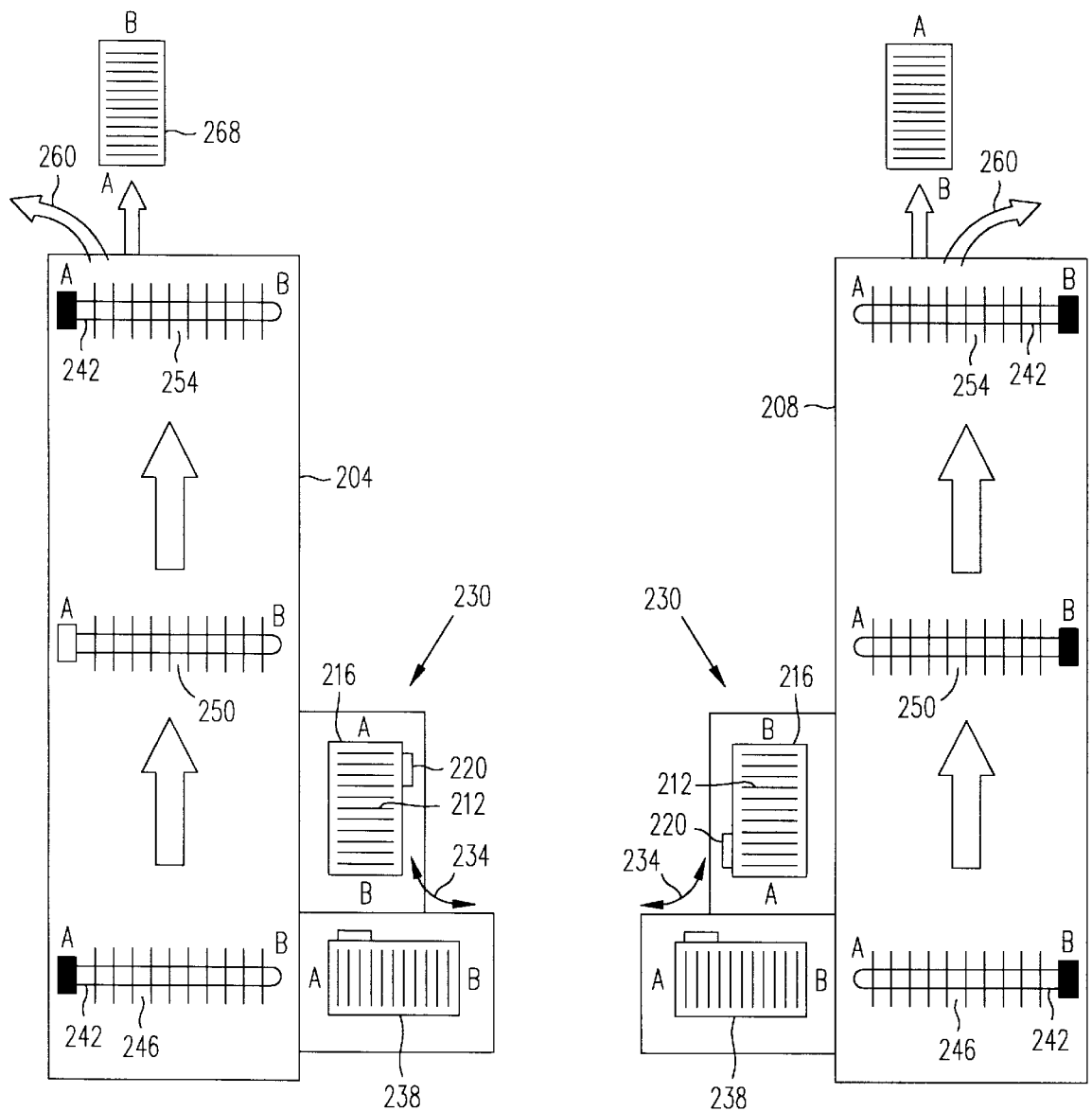
FIG. 15 depicts a pre-existing substrate pre-wash step.

FIG. 15 depicts a prior art disk substrate pre-washing step which utilizes two substrate pre-washing devices in parallel to achieve improved substrate throughput. Thus, FIG. 15 depicts a left side pre-washing device 204 and a right side pre-washing device 208. Initially, it is to be understood that a plurality of disk substrates 212 are disposed within substrate carrier devices 216 having bar code strips 220 disposed at a common location thereon. The ends of the carriers 216 are designated A or B to designate a front or back end of the carrier 216. Corresponding thereto, each of the disks 212 in the carriers 216 have a common orientation of one side (A) being disposed towards the front (A) of the carrier 216 and the other side (B) of the disks 212 being disposed towards the rear end (B) of the carrier 216. The surfaces A and B of the disks correspond to the upper A and lower B surfaces (14 and 18 respectively) of the disks discussed hereinabove, such as are depicted in FIGS. 2 and 3. The operation of the substrate pre-wash devices 204 and 208 commences with the placement of a disk carrier 216 in the bar code reading location 230 whereupon the operator utilizes and bar code reading device to identify the particular carrier to monitor this disk processing step. It is significant to note that the carriers 216 are placed such that the commonly located bar code strip 220 is outwardly disposed such that it can be read by the operator.

After the bar code has been read by the operator, the carrier 216 is rotated 234 to the substrate loading position 238. At this point it is significant to note that the carrier orientation for the left side pre-wash device 204 is oriented such that the A end is loaded first, whereas the right side substrate device 208 is oriented such that the B side of the carrier is to be loaded first. Thereafter, the disk substrates are loaded into the pre-wash device on a pivotal arm 242. The substrate disks are then processed by moving the arm 242 with disks disposed thereon from an initial loading position 246 through the pre-wash device 250 to an unloading point 254 at the end of the pre-wash device. To output the disks, the arm 242 is pivoted 260 outwardly, and the disks are automatically removed from the arm 242 and placed within a subsequent carrier device 268. At this point it is significant to note that the disks in the carrier 268 of the left side pre-wash device 204 are oriented with the B side forward, whereas the disks output from the right side pre-wash device 208 are oriented with the A side forward.

Within the substrate pre-wash device a plurality of rotating brush-like devices are interposed between the disks to clean the surfaces of the disks. The brushes generally comprise a rotating thin disk having a plurality of polyvinyl acetal scrubbing pads disposed thereon, and the brushes in the left side device 204 and the right side device 208 rotate in the same direction when cleaning the disk substrates. It is the rotating action of the brushes that is believed to cause the arcuate micro-scratches.

Following the pre-wash step, the disks in the carriers 268 are further processed and ultimately merged together for the thin film deposition steps. It was heretofore not recognized as being significant that the orientation of half of the disk substrates had been altered when passing through either the left side 204 or the right side 208 substrate pre-wash devices. Furthermore, it had not heretofore been discovered that the arcuate micro-scratches discussed in detail hereabove were created by the substrate pre-wash devices 204 and 208 during the pre-wash step.

Figure 16:
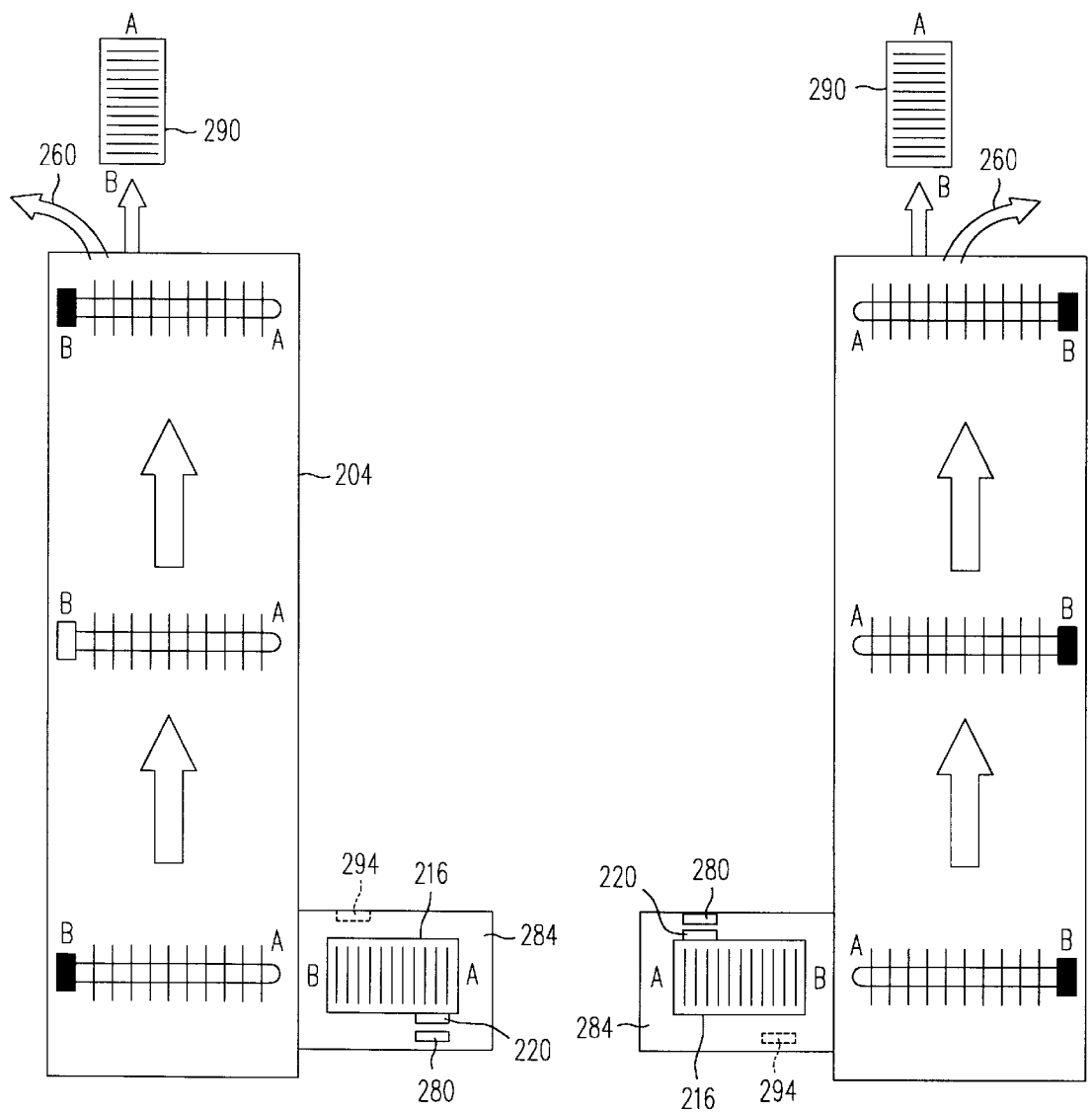
FIG. 16 depicts an improved substrate pre-wash step of the present invention.

FIG. 16 depicts the improved substrate pre-wash configuration. A bar code reader 280 is fixedly engaged to the disk input platform 284 such that a common side such as side B of the cassette carrier is disposed for loading into the pre-wash device for both the left side device 204 and the right side device 208. It is preferred that the bar code reader 280 be fixed in place to eliminate the possibility of operator error in disk substrate loading. Thereafter, the substrate pre-wash device is operated as described hereabove. It is to be noted that when the substrates are output into carriers 290 that they are now oriented identically, with the A side forward. Thus, all disks from the substrate pre-wash devices are now identically oriented (with the same side forward). Also, and most significantly, in regard to the overall process as depicted in FIG. 14 that where the ultimate disk orientation in the hard disk drive as compared with the micro-scratch orientation 124 results in unacceptable defects owing to the common arcuate direction of the arcuate micro-scratches and the disk writing path, that the re-orientation of the disks (disk flipping) is easily accomplished by inputting the disks into the disk pre-washing devices 204 and 208 in the opposite direction. That is, by loading the disks from the A side of the carrier 216 rather than the B side as depicted in FIG. 16. This change in orientation is easily and effectively accomplished by simply removing and re-affixing the bar code readers 280 at the input surfaces 284 to the new locations 294 depicted in phantom in FIG. 16. Thus, because the orientation of the disks is a known process parameter throughout the manufacturing process of the hard disk drive, by altering the input direction of the disk substrates into the substrate pre-wash device, any micro-scratches that occur therein can be optimally oriented to produce a minimal number of defects.

It is to be understood, and within the scope of the present invention, that substrate disks having micro-scratches may be generally oriented to a optimal orientation in processing steps other than at the input to the pre-wash devices. That is, in a hard disk drive manufacturing line, where disks outputted from the substrate pre-wash device have the non-optimal orientation, the disk carriers 290 can be rotated (A side first to B side first) during any subsequent manufacturing step, including the loading or unloading from the thin film deposition devices, or in hard disk drive assembly steps subsequent thereto.

It is therefore to be understood that the heart of the present invention involves the recognition that non-random arcuate micro-scratches are formed in the disk surfaces during manufacturing, and that the disks can be optimally oriented in the hard disk drive such that the occurrence of disk defects is substantially reduced.

While the present invention has been shown and described with regard to certain preferred embodiments, it is to be understood that alterations and modifications of the present invention will become known to those skilled in the art upon reviewing the preceding detailed description of the invention. It is therefore intended by the inventors that the following claims cover all such alternations and modifications that include the true spirit and scope of the invention.

What we claim is:

1. A method of manufacturing disk drives including thin film disks comprising the steps of:

subjecting a disk substrate to a cleaning process which causes arcuate micro-scratches in first and second planar surfaces of the substrates, the arcuate micro-scratches on the first and second planar surfaces predominantly arcing in a common direction of curvature with respect to a radius of the substrate;

depositing at least one thin film on first and second planar surfaces, including a magnetic film, to form a magnetic disk;

determining the common direction of curvature of the arcuate micro-scratches on first and second planar surfaces of the magnetic disk;

mounting the substrate on a spindle which will rotate the disk in a first direction when installed in the disk drive; and merging the disk with an actuator assembly which has first and second read heads for the first and second planar surface respectively, the actuator assembly being pivotally mounted to move the first and second read heads in an arcuate direction across the planar surfaces which is substantially different from the common direction of curvature of the micro-scratches.

2. A method as described in claim 1 wherein said step of subjecting said disk substrate to a cleaning process is performed with said disk substrate in a first orientation, and said step of mounting said disk on a spindle is performed with said disk in a second orientation.

3. A method as described in claim 2 wherein said second orientation of said disk corresponds to the flipping over of said disk from said first orientation.

4. A method as described in claim 1 wherein magnetic bits having a generally rectangular shape including a longitudinal axis thereof are written onto each surface of said disk; and wherein said micro-scratches pass through said data bits in a direction that is substantially different from said longitudinal axis.

5. A method as described in claim 1 including the further steps of:

determining the arcuate path that said read/write head will take in writing on the surfaces of said disk; and changing an orientation of said disks before said disks are mounted on said spindle whereby the occurrence of defects is minimized.

6. A method as described in claim 5 wherein said step of changing the orientation of said disks includes the step of changing the orientation in which disk substrates are input into a disk substrate pre-wash device during the manufacturing of said disk substrate.

7. A method as described in claim 6 wherein said step of changing the orientation in which said disk substrates are input into said pre-wash device includes the step of altering the location of a disk carrier bar code reading device.

8. A hard disk drive including at least one thin film disk comprising:

a disk having a substrate including arcuate micro-scratches in first and second planar surfaces of the substrate, the arcuate micro-scratches on the first and second planar surfaces predominantly arcing in a common direction of curvature with respect to a radius of the substrate;

said disk being mounted on a spindle which will rotate the disk when installed in the disk drive; and an actuator assembly which has first and second read heads for the first and second planar surfaces respectively, the actuator assembly being pivotally mounted to move the first and second read heads in an arcuate direction across the planar surfaces which is substantially different from the common direction of curvature of the micro-scratches; and wherein said common direction of curvature of said micro-scratches corresponds to a first manufacturing orientation of said disk, and wherein said disk is mounted on said spindle in a second orientation.

9. A hard disk drive as described in claim 8 wherein magnetic bits having a generally rectangular shape including a longitudinal axis thereof are written onto each surface of said disk; and wherein said micro-scratches pass through said data bits in a direction that is substantially different from said longitudinal axis.

10. A disk as described in claim 8 wherein said second orientation corresponds to the flipping over of said disk from said first orientation.

11. A method of manufacturing disk drives including thin film disks comprising the steps of:

determining, for a first disk substrate orientation, the direction of curvature, relative to a radius of said substrate, of non-random arcuate micro-scratches formed during manufacturing on the surfaces of said disk substrate;

determining the direction of curvature, relative to a radius of said disk, of the arcuate writing path of magnetic data bits to be written upon the surfaces of said disks;

determining, for said first disk substrate orientation, whether said direction of curvature of said arcuate micro-scratches corresponds to said direction of curvature of said arcuate writing path;

changing said first disk substrate orientation to a second orientation, where said direction of curvature of said arcuate micro-scratches of said first disk substrate orientation substantially corresponds to said direction of curvature of said arcuate writing path.

12. A method as described in claim 11 wherein said second orientation corresponds to a flipping of said disk over from said first orientation prior to mounting said disk in a disk drive assembly.

13. A method as described in claim 12 wherein said arcuate micro-scratches are formed in said surfaces of said disk substrates by a substrate prewash device.

14. A method as described in claim 13 wherein said first orientation of said disk substrates corresponds to inputting said substrates into said prewash device with a first disk surface leading, and said second orientation of said disk substrates corresponds to inputting said substrates into said prewash device with a second disk surface leading.

15. A method as described in claim 14 wherein said step of changing said disk substrate orientation includes the step of altering the location of a disk carrier bar code reading device disposed in association with said prewash device.

* * * * *

UNITED STATES PATENT AND TRADEMARK OFFICE
CERTIFICATE OF CORRECTION

PATENT NO : 6,081,411
DATED : June 27, 2000
INVENTOR(S): Green et al.

It is certified that an error appears in the above-identified patent and that said Letters Patent are hereby corrected as shown below:

The patent title should read:

--THIN FILM DISK MEDIA USING OPTIMUM SURFACE SCRATCH ORIENTATION TO WRITTEN DATA TRACKS--

Signed and Sealed this

Twenty-second Day of May, 2001

Attest:

NICHOLAS P. GODICI

Attesting Officer     Acting Director of the United States Patent and Trademark Office